United States Patent [19]

Davis

[11] 4,135,244
[45] Jan. 16, 1979

[54] METHOD AND APPARATUS FOR PROGRAMMING AND REDUCING RUNOUT IN ROTATING SHAFT VIBRATION SIGNAL DETECTION

[75] Inventor: Robert D. Davis, Spring Valley, Calif.

[73] Assignee: Spectral Dynamics Corporation, San Diego, Calif.

[21] Appl. No.: 817,363

[22] Filed: Jul. 20, 1977

[51] Int. Cl.² ............................................. G01M 1/16
[52] U.S. Cl. ........................................ 364/508; 73/660
[58] Field of Search .......... 364/508; 324/71 R, 34 PS, 324/34 D, 34 E; 73/660, 570, 579, 654, 658, 661

[56] References Cited

U.S. PATENT DOCUMENTS

| | | | |
|---|---|---|---|
| 3,733,892 | 5/1973 | Rennick | 73/71.4 |
| 3,848,115 | 11/1974 | Sloane et al. | 235/151 |
| 3,851,242 | 11/1974 | Ellis | 324/34 PS X |
| 3,938,394 | 2/1976 | Morrow et al. | 73/462 |
| 3,986,380 | 10/1976 | Biggs | 324/34 D X |

*Primary Examiner*—Edward J. Wise
*Attorney, Agent, or Firm*—Brown & Martin

[57] ABSTRACT

Method and circuit for detecting the slow roll electrical runout signal of a rotating shaft, as synchronized with a tachometer signal, and impressing this signal waveform in digital form in a memory in an encoding section, and subsequently transferring the digital runout information to a programmed read only memory module, and then using the PROM module in a method and circuit for subtracting electrical runout signals from the composite electrical runout signal and vibration signal generated in a proximity probe circuit by the shaft rotating at operational speed, and monitoring and controlling the encode section to provide low frequency detection lock out circuits and to provide digital readout of the instantaneous mils peak of the composite signal outputs of the subtract runout signal, composite signal and corrected signal.

21 Claims, 9 Drawing Figures

METHOD AND APPARATUS FOR PROGRAMMING AND REDUCING RUNOUT IN ROTATING SHAFT VIBRATION SIGNAL DETECTION

BACKGROUND OF THE INVENTION

Rotating shaft vibration monitoring systems are widely used to determine excessive shaft vibration that can lead to destruction of the machinery, and to provide information on which the rotating shaft or machinery can be balanced to reduce or eliminate the vibration. The vibration monitoring systems normally use transducers to detect the extent of the vibration. These transducers may comprise velocity pick-ups, accelerometers, and non-contacting transducer probes or proximity probes.

Eddy current proximity probes have proved to be the best transducers for machinery protection devices. However, the non-contacting eddy current displacement transducers suffer from the problem of "electrical runout". "Runout" is the mechanical imperfection in machine shafts. It has also been adopted as the name for the output signal of a vibration pick-up that does not represent shaft vibratory motion, but is caused by the eccentricity of the shaft, surface irregularities, or by properties of the shaft that cause the vibration probe to give an incorrect vibrating signal. This latter type incorrect signal is called "electrical runout" and it is the electrical runout that presents the major difficulties, because if the electrical runout is sufficiently large, it makes it difficult or impossible to accurately determine the extent of the vibrating signal in the composite output signal from the eddy current probe.

Mechanical and/or electrical runout can be reduced by proper finishing of the surface that the vibration pick-up is electrically observing, and methods such as shaft peening and knurling have been developed to reduce the electrical runout. The peening and knurling techniques, however, have only had limited success and do not help at all in the case of chrome plated shafts or shafts that are chrome-nickel alloy. While electronic elimination of the runout signal is used in some manufacturer's test stands, until the present, these methods are not suitable for use in plant monitoring systems due to the high cost per channel and the poor reliability of the continuous monitoring. It is therefore advantageous to have a low cost, reliable electronic runout subtractor that is suitable for use in standard, continuous, monitoring systems.

SUMMARY OF THE INVENTION

In an exemplary embodiment of this invention, a method and circuit is provided for reducing by a subtract electrical runout signal, the runout signal portion of a composite runout signal and vibration signal generated in a proximity probe circuit by a rotating shaft. The combined subtract runout signal and composite signal are synchronized with the rotating shaft tachometer signal. The circuit has an encode section that operates when the shaft is rotated at a slow RPM. At this slow RPM, the vibration signal is relatively small, and thus the primary signal is the runout signal. This electrical runout signal is stored in a digital memory, which digital information is then transferred to a programmed read-only memory module. This PROM module is then inserted into a runout subtractor circuit that is used with the proximity probe circuit to remove the runout signal from the composite runout signal and vibration signals generated in the probe circuit, thus providing a detectable and operationally usable vibration signal ouput.

In the encoding section, the tach input signal, which is the reference pulse signal for the system, is used to trigger a phase lock loop circuit. This phase lock loop circuit in turn becomes a master dynamic clock for both the encoding and subtractor mode of the programmer circuit. The probe data input to the encoding section is fed to an A to D converter that digitalizes the analog data for storage in a RAM circuit. After the data is stored in the RAM circuit, the encoding section is capable of operating in the same mode as the runout subtractor circuit, thus testing the effectiveness of electrical runout data stored.

A runout programmer portion of the circuit provides for transferring the digital information from the RAM to the PROM module, while being synchronized with the tach signal. Thus, the runout electrical signal generated by the probe circuit for a given "slow-roll" rotating of the shaft to be monitored, is made in a manner that it may be synchronized with the composite output signal generated by the probe circuit for the given shaft, when the shaft is rotated at operational speeds. The electrical runout signal in the PROM may thus be subtracted from the composite signal at operation shaft speeds to reduce the unwanted electrical runout. The data stored in the RAM in the encoding section is permanently burned as digital information in the PROM module or IC, which module can then be quickly and easily placed into a separate runout subtractor circuit.

A monitoring secton comprises an overall detection circuit that determines the peak to peak amplitude of the vibration output signal from the encoding section. This vibration output signal may have the electrical runout signal subtracted as in the runout subtractor mode, or it may merely read the peak to peak amplitude of the input signal from the probe and detector circuit, by having the runout subtractor mode in by-pass condition. This provides the operator with the ability to read the overall condition of the vibration data before and after applying the detected and stored electrical runout data signal.

It is therefore an object of this invention to provide a new and improved method and circuit for reducing electrical runout signals in the output of proximity probe circuits and detection circuits such as used in systems monitoring vibration in rotating shafts.

It is another object of this invention to provide a new and improved method and circuit for determining the electrical runout signal and synchronizing this electrical runout signal with a tachometer signal and storing this information in memory, which information in digital form is subsequently transferred and burned into a PROM module that is used in an electrical runout subtract circuit for subtacting the electrical runout from the composite signal generated by the probe when rotating the shaft at substantially operational RPM.

It is another object of this invention to provide a new and improved method and circuit that provides low cost, reliable electronic runout subtractor modules and circuits suitable for use in standard, continuous, monitoring systems to remove electrical runout.

Other objects and many advantages of this invention will become more apparent upon a reading of the following detailed description and an examination of the drawings, wherein like reference numerals designate like parts throughout and in which:

Figures 6, 7:
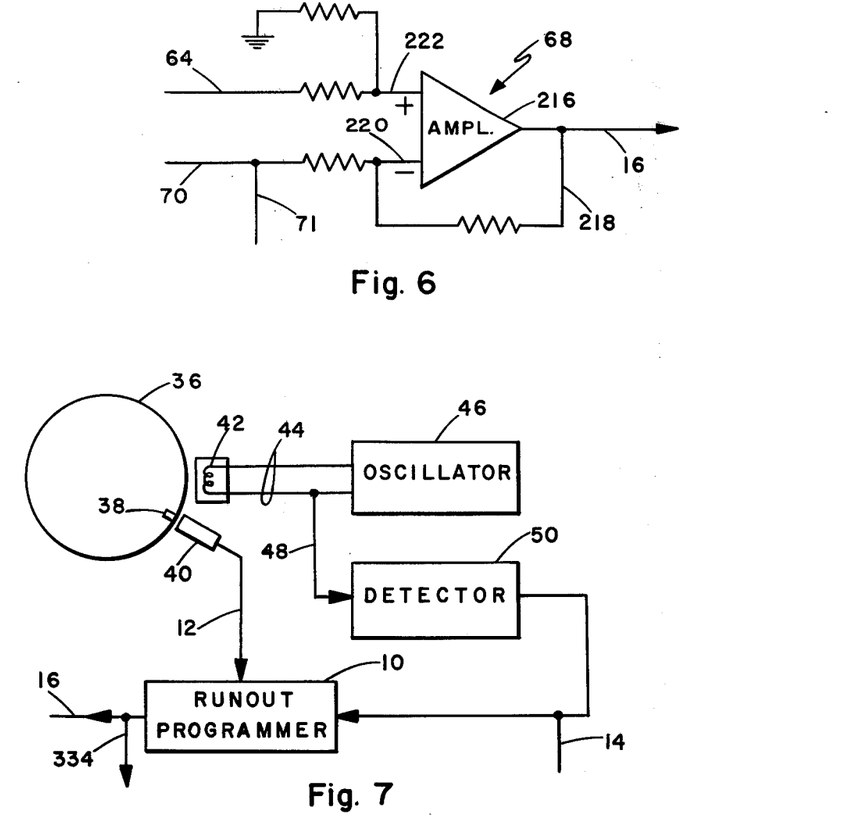
FIG. 6 is an illustrative differential amplifier circuit that may be used in the subtract amplifier circuit of FIG. 2 and the subtract amplifier circuit of FIG. 5.
FIG. 7 is a block diagram and schematic illustration of the probe detector circuit and tachometer detector in operational connection with the runout programmer.

Referring now to FIG. 7 in the drawings, a rotating shaft 36 rotates around its axis in the normal manner. Shaft 36 has a slot 38 that is sensed by tach probe 40 to provide a tach signal for each revolution of the shaft 36, which tach signal is fed through line 12 to the runout programmer 10. A spaced proximity probe 42 comprising a transducer coil connected through lines 44 to oscilator 46, is positioned at a spaced gap, normally about 100 mils, from the surface of the shaft 36. The oscillator 46 in the known manner provides a signal of about 2 MHz. The shaft 36 induces into the probe an electrical signal that modifies the sine wave of the oscilator 46. The conductivity as well as the permeability of the shaft and its surface condition and the spacing of the probe has a distinct effect on the sine wave signal. Lines 48 pick off this signal that is then passed through the detector 50 that provides a DC output having a magnitude commensurate with the degree to which the sine wave in the oscillator circuit probe 42 is modified by changing the "gap" between the transducer 12 and the shaft 10 by shaft vibration, and that commensurate with the electrical runout signal.

The DC output of the detector 50 is fed through line 14 to the runout programmer 10, that processes this signal in a manner that will be described in more detail hereinafter. It is to be understood that the runout programmer 10 in the circuit of FIG. 7, may be replaced by the runout subtractor circuit 311 of FIG. 5, wherein the output line 334 of the runout subtractor circuit 311 corresponds with the output line 16 in FIG. 7.

Figure 1:
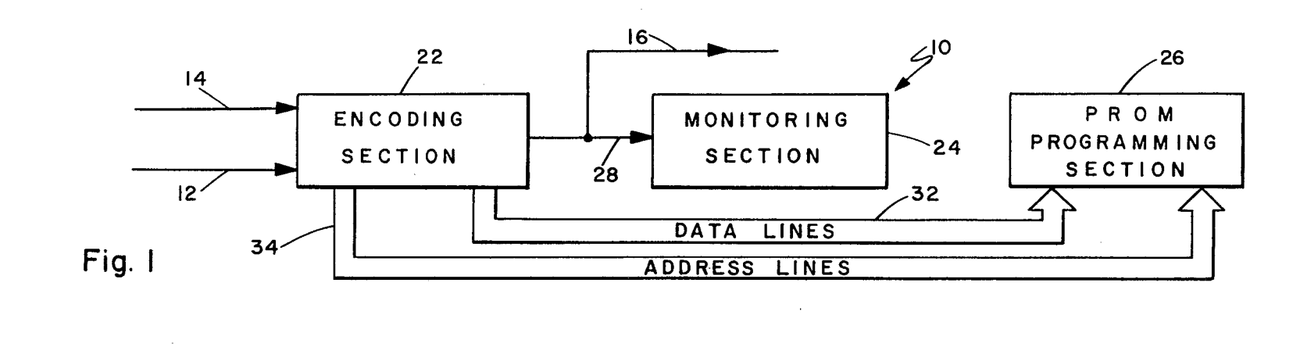
FIG. 1 is a block diagram illustrating the component section parts of the runout programmer.

The runout programmer illustrated in block sections, see FIG. 1, has an encoding section 22, a monitoring section 24 and a programmable read only memory or PROM programming section 26. The input from the tachometer line 12 is fed to the encoding section 22. The DC output of the detector 50 is received through line 14. The encoding section 22 in a manner that will be more apparent hereafter, feeds data through data lines 32 to burn in the PROM in the PROM programming section 26 as accessed by the address counter signals through address lines 34. The monitoring section 24 monitors the peak to peak voltage output in line 16 of the runout programmer 10.

Figure 2:
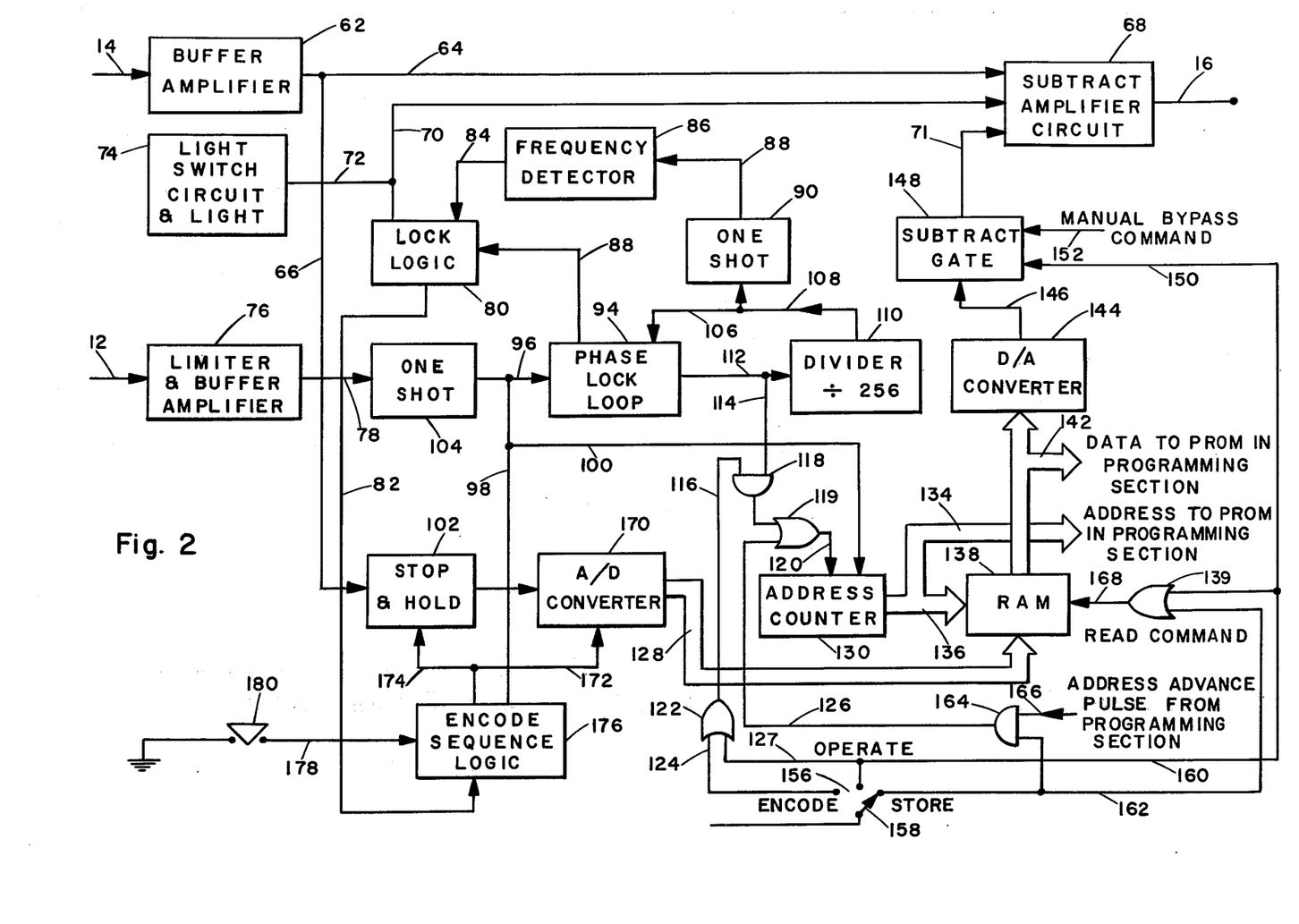
FIG. 2 is a block and schematic diagram of the encoding section of FIG. 1.

Referring now to FIG. 2, the encode section 22 receives the DC output of detector 50 through input line 14. This input DC signal is fed to a buffer amplifier 62 that transmits the input DC data through line 64 to the subtract amplifier circuit 68 and through line 66 to the sample and hold circuit 102. The input tach signal is fed through line 12 to the input buffer and limiter circuit 76 that accepts the tach signal input, which is used as a reference pulse once per turn to synchronize the phase lock loop to the incoming data. The tach signal is fed through line 78 to the one-shot circuit 104, that conditions the output to provide a consistent pulse width reference pulse through line 96 to the phase lock loop circuit 94, and through line 100 to the address counter 130, and through line 98 to the encode sequence logic 176. The phase lock loop circuit 94 multiplies the incoming signal from the one-shot 104 by 256. This multiplied count output is fed through line 114 to one side of AND gate 118 and is fed through line 112 to divider 110. Thus, divider 110 provides an output in line 108 that corresponds to the tach input signal, which is fed through line 106 back to the phase lock loop circuit 94 and is locked on by the phase lock oloop circuit 94.

The 256 counts per tach signal or RPM of the shaft 36 is fed through AND gate 118, when there is a corresponding signal on line 116, and through line 120 to the address counter 130. The address counter 130 is reset at the start of each synchronized run by the tach signal through line 100. Thus, address counter 130 counts and through lines 136 accesses between 0 and 255 the random accept memory (RAM) to be encoded with data from the A to D converter 170.

The output of the address counter, which is an address that runs between 0 and 255, is also fed through lines 134 to address the PROM in the PROM programming section 26 in a manner that will be described hereinafter.

Figure 8:
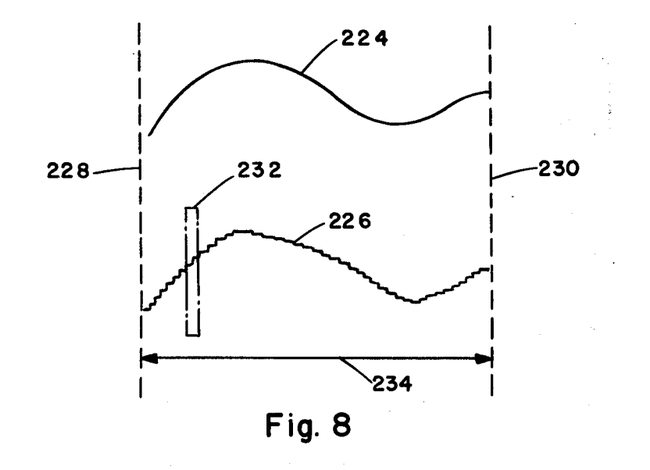
FIG. 8 are waveform diagrams of a electrical runout signal, and its digital representation as stored in the RAM or PROM portions of the circuit.

The input DC voltage output of detector 50 has a waveform that for example may correspond to waveform 224 in FIG. 8 and is fed through line 66 to the sample and hold circuit 102. This sample and hold circuit 102 samples the input data from the buffer amplifier 62 and holds the value during the encoding of the A to D converter 170. This assures that the A to D converter 170 can accurately determine the analog voltage without it moving around during the encode cycle. The sample and hold occurs for a brief period, 256 times per tach revolution. The output of the sample and hold 102 is the input to the A to D converter 170 that feeds the digital output through lines 128 to the RAM 138. Thus, RAM 138 stores the incoming signal waveform in line 14 as a digitized signal.

The encode sequence logic 176 is energized by manual control circuit 180, which provides a ground signal through line 178 to the encode sequence logic 176. The encode sequence logic 176 controls the A to D converter 170 through line 172 and the sample and hold circuit 102 through line 174 during the encode sequence of one revolution. This sequence is initiated by push button 180, which acts as a trigger for the encode sequencing logic 176. It may be understood that the switch control 180 may be controlled by a program device as known in the art. The encode sequence logic 176 is also synchronized in its initial start operation by the general clocking of the input tach signal through line 98.

The mode switch 156 is also closed with contact 158 connected to encode, to provide a signal through line 124 and through OR gate 122 and line 116 to AND gate 118. AND gate 118 thus passes the count from the phase lock loop circuit 94 to the address counter 130.

The output of the divider circuit 110 is fed through line 108 and line 106 to the one-shot circuit 90. This one-shot 90 conditions the output of the divider circuit 110 to a constant narrow pulse that is fed to frequency detector 86 through line 88. The frequency detector 86 determines when the phase lock loop 94 output is synchronized to a frequency of between about 300 cycles per minute and 1200 cycles per minute, so this information can be used by the lock logic for control of the subtractor amplifier circuit 68 and the encode sequence logic 176. When the phase lock loop frequency is not between 300 cycles per minute and 1200 cycles per minute, then the frequency detector provides a designated output in line 84 to the lock logic 80. Also when the phase locked loop 94 cannot hold lock because of low CPM, then an out of lock signal is fed through line 92 to the lock logic 80. Lock logic 80 accepts an out of lock signal from line 84 and/or line 92, and when the signal indicates low CPM it provides a control signal to the subtract amplifier circuit 68 that drives it to a negative voltage output in line 16. This indicates to a subsequent monitor circuit that the encoding section is not operating. Thus the monitor doesn't provide spurious and misleading readings through the monitor. Also, the lock logic circuit 80 provides an output through line 82, for low or high CPM, that inhibits the encode sequence logic 176, preventing it from sequencing slow roll electrical runout data to the RAM under conditions of too low or too high CPM. Further, line 72 feeds an output signal to a switch 74 that switches on an indicator light indicating low CPM conditions.

In operation of the encode section 22, shaft 136 is rolled at a CPM of between 300 to 1200. At this low CPM, the vibration signal of shaft 136 is low and thus the relative magnitude of the electrical runout signal is large. The electrical runout signal, such as corresponds with waveform 224 in FIG. 8 is fed through line 14 and through the sample and hold circuit 102 and through the A to D converter 170 to RAM 138. The memory sections are addressed by the address counter 130 as initiated by switch contact 158 of switch 156 being connected to the encode tap. The encode sequence logic circuit 176 is energized by push button control switch 180 and by the encoding range being in the region of 300 CPM to 1200 CPM, and sequences the encoding. Thus, the electrical runout for a given shaft 36 is determined at the desired CPM range and is placed in the RAM 138.

In the operated mode, contact 158 of mode switch 156 is placed in contact with the operate contact. This provides a voltage through line 160 to read command line 168 to RAM 138 and also through line 150 that opens subtract gate 148. The operate signal also passes through line 127 and through OR gate 122 in line 116 and to AND gate 118, that gates the clock count signals to the address counter 130 that accesses the RAM 138. Thus RAM 138 reads out the store digital runout data through lines 14 through A to D converter 144, through line 146, through subtract gate 148 and through line 71 to the subtract amplifier circuit 68.

It may be understood that RAM 138 does not accept new data during this mode of operation from the input data circuit 14 as the encode sequence logic 176 is de-energized. Also during operate, the RPM of the shaft 36 is raised to its operational speed, which may be in the order of 6000 RPM, and provides the composite signal from detector 50 that incorporates the electrical runout signal and the vibration signal. This composite signal is thus fed through line 64 to the subtract amplifier circuit 68. The locked logic 80 only provides an output through line 70 for low cycles per minute, and thus does not inhibit or drive to negative condition the subtract amplifier circuit 68. Thus, the subtract amplifier circuit 68 subtracts the stored electrical runout data in the RAM 138 from the composite data signal received through line 64, providing the output in line 16 that is the composite signal with the electrical runout reduced.

In this mode, RAM 138 has different memory sections accessed. As illustrated in FIG. 8, the digital representation 226 of the input electrical runout signal 224 is a series of word slices 232, each having 8-bits to provide 256 levels. Each slice 232 thus encompleshes the magnitude of that particular bit. The RAM 138 is addressed to accept the information for each of the 256, 8-bit words.

A manual by-pass command line 152 feeds a signal to the subtract gate 148 that closes the gate thus preventing the analog electrical runout signal from passing through line 71 to the subtract amplifier circuit 68. The subtract amplifier circuit 68 may comprise differential amplifiers, such as illustrated in FIG. 6. The operational amplifier 216 receives the input composite signal on line 64 and line 222, and receives the corrective electrical runout signal through line 71. The differential amplifier 216 thus subtracts the electrical runout in line 71 from the larger composite signal in line 64 and sends the adjusted signal out of line 16.

So in operation of the operate mode, the operator may be acuating the manual by-pass command view and analyze in line 16 only the composite signal generated by detector 50. Also the operator can by removing the manual by-pass command, but in the operate mode, view the composite data signal in line 64 with the electrical runout signal subtracted therefrom. This tests the effect of the removal of the runout signal. Also by inserting a synthesized tach signal in line 12, the stored electrical runout signal in the RAM 138 can be viewed and analyzed by the monitor connected to line 16.

Figure 9:
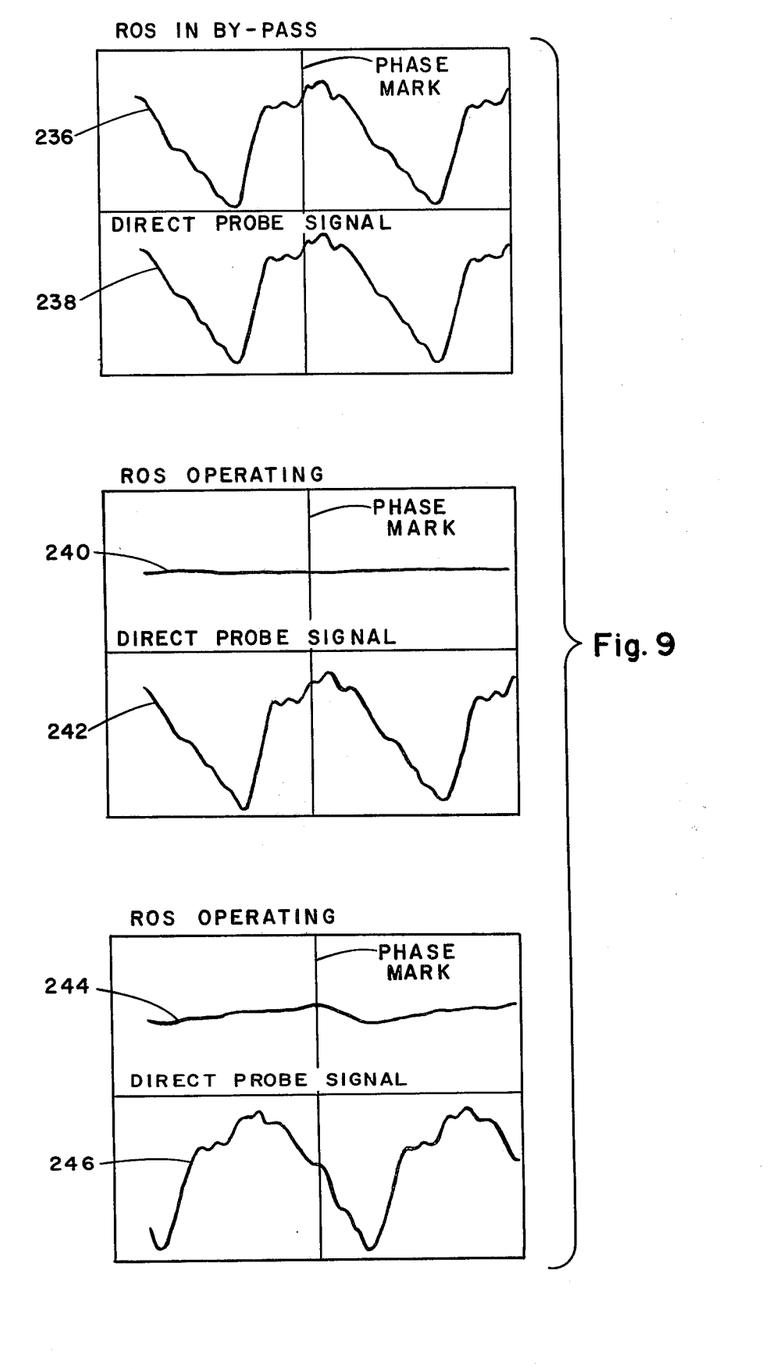
FIG. 9 is a plurality of waveforms representing and illustrating the effect of the circuit in removing electrical runout.

Referring to FIG. 9, there is illustrated in waveform 236 the runout signal that is stored in the RAM 138. Also in slow roll encode, waveform 238 illustrates the direct probe signal that is the output of detector 50 to line 14. Waveform 240 reflects the signal output in line 16 when the composite signal is fed through line 64 and the subtract electrical runout signal 236 is fed through line 71 to the subtract amplifier circuit 68. At this low CPM, the electrical runout signals cancel, as shown by the relatively small vibration component in waveform 240. At the same time, signal 242 reflects the direct probe signal from detector 50.

In operation of the shaft 36 at about 6000 RPM, waveform 246 shows the direct probe signal received from detector 50. This is the composite signal of the electrical runout and the vibration. Waveform 244 displays the signal output at line 16 in the subtract mode, wherein the electrical runout stored in RAM 138 is subtracted from the input composite signal 246 in line 64 in subtract amplifier circuit 68.

Figure 3:
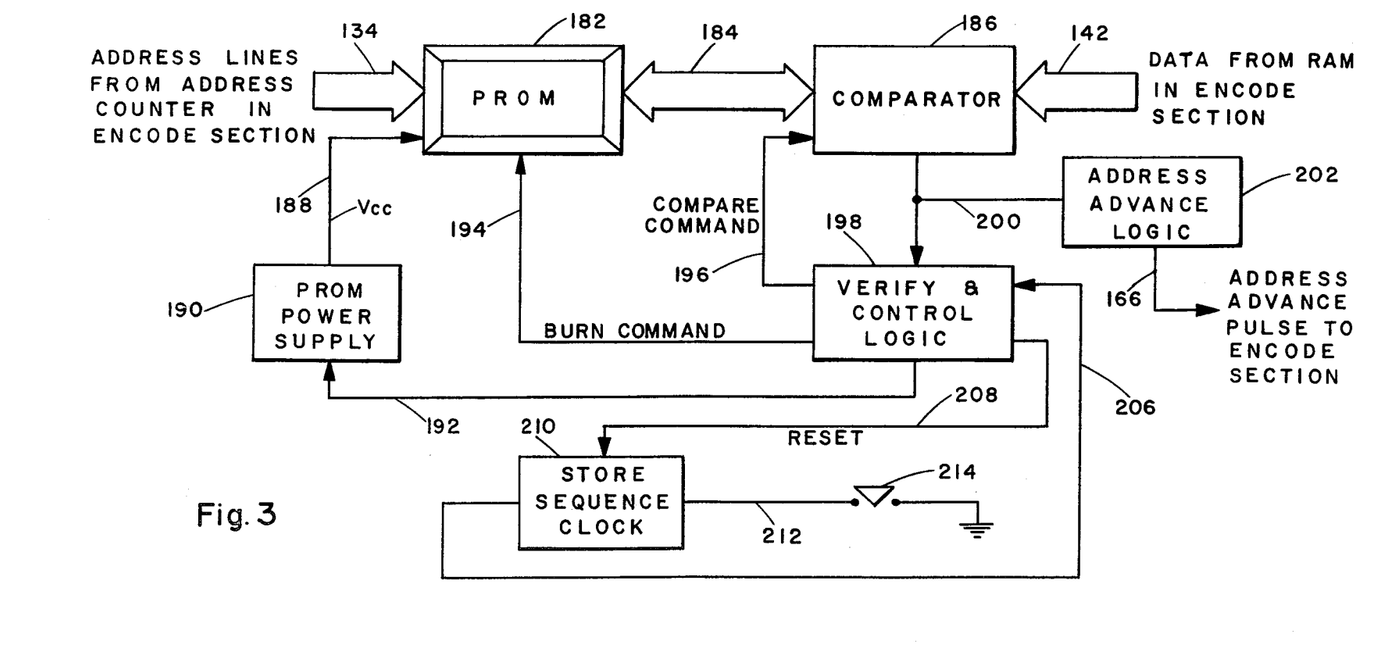
FIG. 3 is a block and schematic diagram of the PROM programming section of FIG. 1.

When it is desired to transfer the stored, digital electrical runout signal to the PROM, see FIGS. 2 and 3, then switch contact 158 of switch 156 is moved to the store contact. Voltage is then supplied through line 162 to AND gate 164. So when a pulse is received on line 166, it is passed through gate 164 and through line 126 and through OR gate 119 and line 120 to the address counter 130. This one pulse count advances the address counter one count and in output lines 136 to the RAM and 134 to the PROM circuits advances each of these circuits one count. The store mode also energizes through line 160 the read command 168 to the RAM 138. So the digital information stored in the read access memory 138 is fed through line 142 to the comparator 186 for each pulse. The pulse in lines 134 provide an address to the PROM circuit 182 and at the same time, a corresponding digital word in the RAM 138 is fed through lines 142 to the comparator 186. The inner connection between the comparator 186 and the PROM 182 in a known burn in circuit compares the information in the particular section of the PROM 182 with that data received from the RAM 138.

In operation of the PROM programming section of FIG. 3, a store push button control 214 is closed initiating the storing of the information from the RAM 138 into the PROM 182. A signal is fed through line 212 to start the store sequence clock 210. This clock signal is fed through line 206 to the verify and control logic 198. This logic circuit 198 initially issues a compare command in line 196, to the comparator circuit 186. The comparator circuit 186 makes a comparison and feeds a yes or no signal to line 201 to the verify and control logic, which is a known circuit.

If the PROM 182 does not have the same data as in the RAM 138, then a burn command signal is fed through line 194 to the PROM 182 and at the same time, a voltage range command 192 fed from the verify and control logic 198 to the PROM power supply 190 that supplies a voltage $V_{CC}$ through lines 188 to the PROM 182, that burns the particular data into the particular memory section of the PROM 182. Once the comparator circuit 186 registers a comparison of the data from the RAM 138 in lines 142 with that of lines 184, then a signal is fed through line 200 to the address advance logic circuit 202 that supplies an address advance pulse in line 166 to the encode section. This provides the pulse through AND gate 164 to advance the address counter one count, and thus to provide a one count through line 136 to advance the RAM 138 one count and to also address the next step in PROM 182 through address line 134. Thus by step by step compare and burn commands, the entire signal 226 of FIG. 8 is systematically and sequentially transferred from the ram 138 to the PROM 182, where it is permanently retained. The PROM circuit 182 is a module or IC circuit, that is easily and quickly removable from the programming section and replaced by another PROM module, which is then loaded with the electrical runout signal of another shaft in the manner previously described. Thus the encoding section and programming section provides the means for placing in a permanent memory PROM, the runout subtractor waveform 226.

Figure 4:
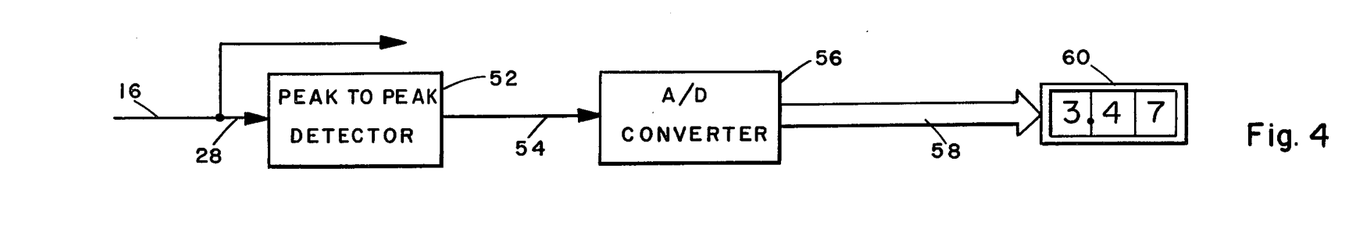
FIG. 4 is a block diagram of the monitoring section of FIG. 1.

The monitoring section, FIG. 4, provides a ditigal read out of the peak to peak amplitude of the output signal of the programmer in line 16. This output signal is fed through line 28 to the peak to peak detector 52. The peak to peak detector 52 produces a DC signal output in line 54 that is proportional to the peak to peak amplitude of the AC component of the output signal in line 16. This DC signal output is then fed to A to D converter 56 that digitizes the DC signal output that is then applied through lines 58 to an actual digital read out in which the operator operatng the monitor reads directly in digital read out, the mils of peak to peak voltage of the output signal.

After the runout programmer circuit has measured the electrical runout for a given shaft proximity probe installation, and has burned this electrical runout signal into the PROM 182; then the PROM IC or module 182 is inserted into a runout subtractor circuit 311, that is positioned with the probe circuit on the machinery and continuously applies the runout subtract signal to the output of the detector 50. For example, see FIG. 7, the runout subtractor circuit 311 of FIG. 5 is inserted and connected in place of the runout programmer 10, with the connections as illustrated and previously described.

Figure 5:
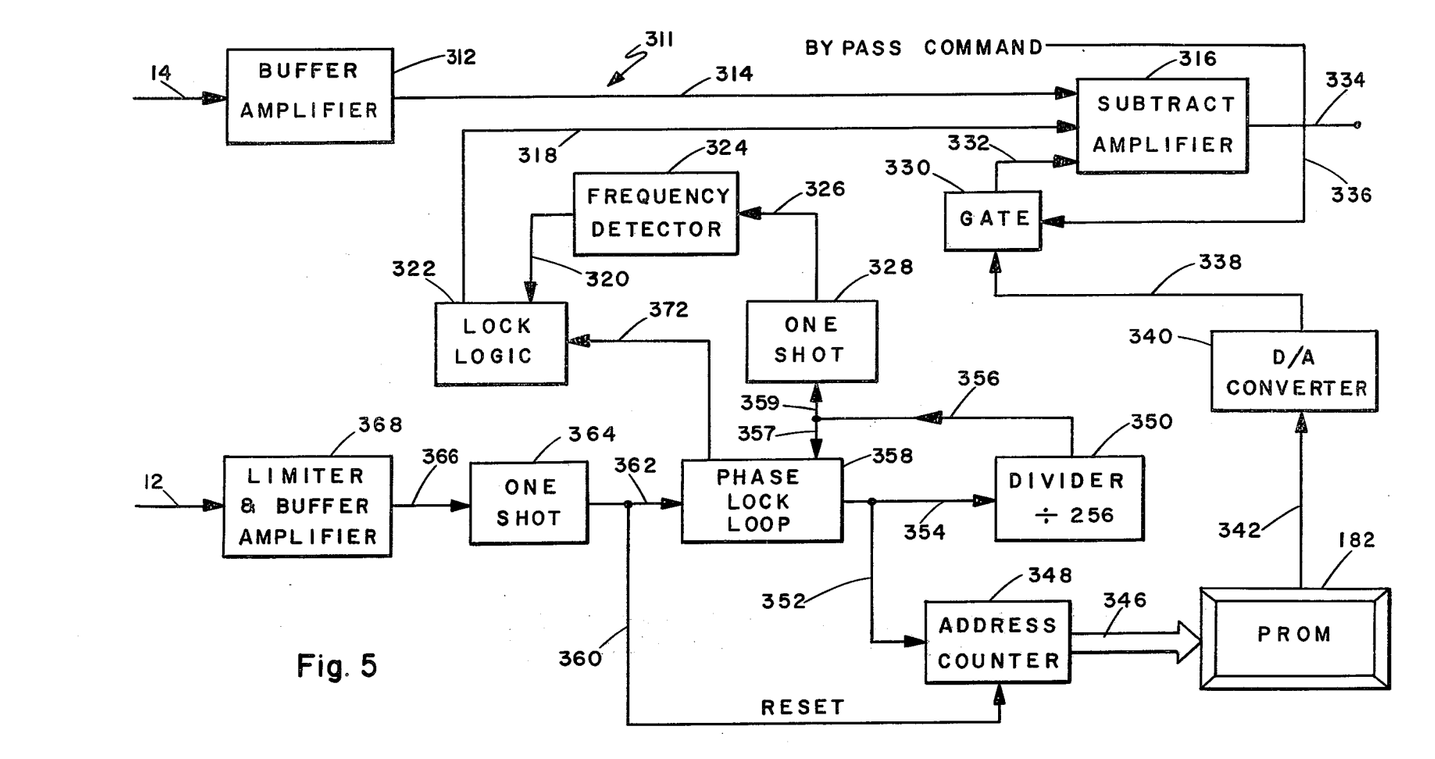
FIG. 5 is a block diagram of the runout subtractor circuit utilizing the PROM module that was programmed by the runout programmer circuit of FIGS. 1 through 4.

Referring now to FIG. 5, the DC output of detector 50 from the probe circuit is fed through line 14 to the buffer amplifier 312 and through line 314 to the subtract amplifiers circuit 316. Simultaneously, the tach signal is fed through line 12 and through the limiter and buffer amplifier circuit 368 and through line 366 to the one-shot multi-vibrator circuit 364. The one-shot 364 provides correctly shaped output pulses that are fed through line 362 to the phase lock loop circuit 358. The phase lock loop circuit 358 functions as a 256 count multiplier circuit that provides 256 counts in lines 352 and 354 for each tachometer input signal. Divider circuit 350 divides the 256 counts by 256, providing an output signal on line 356 that is fed back through line 357 to the phase lock loop circuit 358 that is coherent with the input signal in line 362 when the phase lock loop circuit is in lock. The output of the one-shot 364 is also fed through the reset circuit 360 that resets to 0 count the address counter 348. Upon being reset, address counter 348 then receives and counts the 256 counts from the phase lock loop circuit 358 through line 352, and feeds these output counts through lines 346 to the programmable read only memory or PROM 182.

The PROM 182 is a pre-programmed digital memory circuit module or IC that is an easily and quickly insertable and removable component from the runout subtractor circuit 311. The PROM circuit words. 256, 8-bit words Each of these 8-bit words are programmed to contain the digital equivalent of the analog representation of the electrical runout for the particular shaft being monitored. This PROM circuit 182 is pre-programmed in a programming circuit wherein the shaft 36 is slow rolled with the detected electrical runout waveform, see FIG. 8, synchronized to the tachometer, is changed to digital form and then correctly addressed and inserted into the memory slots of the PROM 182. As illustrated in FIG. 8, the representative electrical runout analog signal generated by slowly rolling the shaft 36, is waveform 224. The corresponding digital subtract runout signal stored in PROM 182 is waveform 226. Signal 226 comprises 256, 8-bit words that provides slices 232 in the complimenting waveform 226 versus 224, that is used to balance out the electrical runout. The utilizing of the 8-bit word in the PROM provides 256 levels for establishing the magnitude of the particular sliced value 232 of electrical runout and the 256 slices or segments of one revolution of the shaft 36.

Thus, the address counter circuit 348 provides the 256 output counts that access the 256 memory slots of PROM 182 and provides the digital output through line 342 to the D to A converter 340 that changes the signal 226 in FIG. 8 to the analog signal 224 in line 338 that is fed through gate 330. Gate 330 is normally open and passes the analog subtract runout signal through line 332 to the subtract amplifiers circuit 316. The subtract amplifiers circuit 316 comprise differential amplifier circuits which may be as illustrated in FIG. 6. The operational amplifier 216 receives the composite signal from line 614 and the electrical runout subtract signal from line 71, which signals are fed through respective lines 222 and 220 to the operational amplifier 216 that then subtracts the runout signal of line 220 from the larger composite signal in line 222. This provides the corrected signal waveform out the output line 16. This corrected output is then supplied to a known subsequent monitor or analyzer circuit or the like.

The feedback signal in line 356 of the phase lock loop circuit 358 is also fed through line 359 to the one-shot circuit 328 that provides an output in line 326 for each tach signal fed through line 12. The signal in line 326 is fed to the frequency detector 324, that detects the RPM of the monitored shaft 36. When the shaft rotation is too slow, that is when the RPM or CPM is below that which will allow the phase lock loop 358 to maintain lock condition or is below the RPM that the shaft was rotated in slow roll to provide the information in PROM 182, then the frequency detector either provides a signal through line 320 to the lock logic 322 that provides a corresponding output signal in line 318, or the phase lock loop circuit 356 provides an out of lock signal in line 318. The corresponding output signal in line 318 is a relatively large voltage that drives the amplifier 216 to a large negative output in line 16, in the order for example 20 volts, which when received by the analyzing monitor is detected by the analyzing monitor as showing that the runout subtractor 311 has become inoperable. Thus the user in viewing the output of the monitor is not mislead by the spruious signals that could otherwise be reflected in the monitor by the out of lock or low RPM condition in the runout subtractor 311.

In operation of the circuit, the particular pre-programmed PROM circuit module 182 is inserted into the circuit 311 and then the shaft 36 is rotated at its given operational speed and is monitored in the normal manner, with the runout subtractor circuit 311 removing the runout electrical signal from the composite signal in line 314. Gate 330 may be selectively closed by any electrical command or by closing a switch manually, or the like, which cuts off the runout signal to the subtract amplifier circuit 316. The user is thus able to monitor the actual signal generated by the probe and detector circuit 42 and 50, both as corrected by the subtractive electrical runout signal and in the uncorrected condition.

It is therefore evident that the PROM 182 is pre-programmed by a circuit that is substantially identical in operation, as illustrated in FIG. 2, and is then employed directly in the runout subtractor circuit 311 in the vibration monitor circuit, to substantially reduced the troublesome electrical runout.

It should be recognized that given PROM's may be switched to different subtractor runout circuits 311 and applied to different rotating shafts or rotating machinery installations.

Having described my invention, I now claim:

1. A circuit for reducing by an electrical subtract runout data signal the runout data signal portion of a composite electrical runout signal and vibration signal generated in a proximity probe circuit by a rotating shaft, which composite signal is synchronized with the rotating shaft tachometer signal, comprising,
a programmable digital memory circuit module,
means for programming into said programmable digital memory circuit module a subtract electrical runout signal for a given probe installation monitoring a given rotating shaft that is synchronized with a tachometer signal from the rotating shaft.
clock means synchronized to the tachometer signal for providing a sequence of output counts,
address means for accessing said digital memory in response to said output counts providing the digital subtract runout signal,
D to A converter means for converting said digital subtract runout signal to an analog subtract runout signal,
Subtract means for receiving said composite signal and said analog subtract runout signal and subtracting said analog subtract runout signal from said composite signal,
and said memory circuit module being selectively removable from said circuit and replaceable by another memory circuit module pre-programmed with a subtract runout signal for another given rotating shaft installation.

2. A circuit as claimed in claim 1 wherein,
said memory circuit module comprising a removable programmable read only memory circuit,
and said clock means comprising a phase lock loop circuit for providing a given number of counts or each tachometer signal.

3. A circuit as claimed in claim 2 including,
frequency detector means responsive to said output counts for providing an output signal when said tach signal is outside the range of a given number or revolutions per minute,
and lock circuit means responsive to said frequency detector output signal for providing a lock signal inhibiting said subtract means from subtracting said analog subtract runout signal from said composite signal.

4. A circuit as claimed in claim 3 wherein,
said subtract means comprising a differential amplifier detector circuit,
and said lock signal from said lock circuit means driving said amplifier to a given negative output signal that is of larger magnitude than the composite signal.

5. A circuit as claimed in claim 1 including,
gate means for gating said analog subtract electrical runout signal to said subtract means,
and means for closing said gate means whereby the output of said subtract means then comprises the composite signal.

6. The method of reducing by an electrical subtract runout signal the runout data signal portion of a composite electrical runout signal and vibration signal generated in a proximity probe circuit by a rotating shaft, which composite signal is synchronized with the rotating shaft tachometer signal, comprising the steps of,
programming into a programmable digital memory circuit module a subtract electrical runout signal for a given rotating shaft and synchronized with a tachometer signal from the rotating shaft,
placing the pre-programmed digital memory circuit module that stores the subtract runout signal for the rotating shaft into a given circuit for use in monitoring the shaft,
through said given circuit providing a series of output counts synchronized to the tachometer signal for accessing the digital memory and providing the digital subtract runout signals, converting the digital subtract runout signal to an analog subtract runout signal, and feeding the subtract runout signal and the composite signal to a subtract circuit that subtracts the subtract runout signal from the composite signal.

7. The method as claimed in claim 6 including the step of, selectively changing the memory circuit module to provide a different subtract runout signal for a different rotating shaft.

8. The method as claimed in claim 6 including the steps of, using a phase lock loop circuit to synchronize the output counts with the tachometer signal, feeding the phase lock loop circuit output counts to an address counter that accesses the memory circuit module, and detecting a low count of said output counts and inhibiting the subtract circuit when said tachometer signal reflects a rotating shaft RPM that is below a set RPM.

9. The method as claimed in claim 8 including the step of, providing a controlling signal to said subtract amplifier when said tachometer signal falls below a given count per minute that has an analog magnitude substantially larger than the analog magnitude of the composite signal.

10. The method as claimed in claim 9 including the step of, selectively gating the subtract runout signal to said subtract circuit, whereby the output of the subtract circuit is the composite signal without subtracting the subtract runout signal.

11. Apparatus for programming and reducing runout in rotating shaft vibration signal detection comprising, transducer means including an eddy current transducer for sensing the runout signal and vibration signal of a rotating shaft and providing a slow roll runout analog signal when slow rolling said shaft and providing a composite analog signal including electrical runout and vibration signals for operational shaft RPM, tachometer detection means for providing a tachometer signal in synchronism with the rotation of the rotating shaft, synchronizing means responsive to the tachometer signal for providing multiple synchronized output counts, means for converting said slow roll runout analog signal to a digital runout signal, memory means responsive to said synchronized output counts for addressing portions of the memory for receiving said digital runout signal, means for reading out the digital runout signal from the memory means, programmable memory means responsive to said synchronized counts for receiving and storing said digital runout signal from said digital memory, said programmable memory being selectively insertable and removable from said apparatus, runout subtractor circuit means for installation on the same transducer means on said shaft from which the slow runout analog electrical signal is obtained, said subtractor circuit comprising second synchronizing means for providing synchronized count outputs synchronized to said tachometer signal, said subtractor circuit having said programmable memory with said digital runout signal therein, said programmable memory means being responsive to access by said synchronized count outputs for providing the digital runout signal, D to A converter means for converting said digital runout signal to an analog runout signal, and subtract amplifier means for receiving said composite analog signal and said analog runout signal and subtracting said analog runout signal therefrom providing an output signal with the runout signal portion substantially reduced.

12. The apparatus as claimed in claim 11 including, encode means responsive to said tachometer signal for providing an encode sequence output, A to D converter means, stop and hold means responsive to said encode output for stopping and holding the input electrical runout analog signal and feeding a stop and hold output to said A to D converter means, and said A to D converter means being operational in response to said encode output for feeding the digital runout signal to said digital memory.

13. The apparatus as claimed in claim 12 wherein, said synchronizing means including phase lock loop means responsive to said tachometer signal for providing said synchronized output counts, frequency detector means responsive to the phase lock loop means output for detecting the frequency of the tach signal and thus the RPM of the shaft and providing a first signal output when said RPM is below a given magnitude and for providing a second signal output when said RPM is above a given magnitude, lock means in response to receiving the first or second signals providing a lock signal to said encode means, means responsive to said lock signal for inhibiting the operation of said encode means.

14. The apparatus as claimed in claim 13 including,

D to A converter means for converting the digital runout signal in said digital memory to an analog runout signal, subtract amplifier circuit means for receiving said slow roll runout analog signal and said analog runout signal and subtracting said analog runout signal from said slow roll analog runout signal for establishing the effectiveness of the analog runout signal stored in said digital memory.

15. Apparatus as claimed in claim 14 wherein, means responsive to a lock signal from said lock means in response to said second signal output from said frequency detector means for feeding an inhibit signal to said subtract amplifier circuit means.

16. Apparatus as claimed in claim 15 wherein, said inhibit signal from said lock means to said subtract amplifier circuit means having a substantially larger voltage than the slow roll runout analog signal or the composite analog signal providing a given polarity output during possible out of synchronization operation of said synchronizing means.

17. Apparatus as claimed in claim 16 including, gate means for selectively gating said analog runout signal to said subtract amplifier circuit for closing off the transfer of said information to said subtract amplifier circuit, whereby said subtract amplifier circuit only passes the slow roll runout signal or the composite signal depending upon the speed of rotation of the shaft.

18. Apparatus as claimed in claim 17 including,
burnin means for burning into said programmable memory said digital runout signal.

19. Apparatus as claimed in claim 18 wherein,
said burn in means comprising comparator means for receiving said digital runout signal from said digital memory and comparing said received digital runout signal with each memory section of said programmable memory,
verify means responsive to said comparator circuit for generating a burn command initiating the application of electrical power to the section of said programmable memory burning the digital information into said programmable memory,
and means for addressed by single address advancement of said comparator programmable memory and digital memory.

20. The method programming programing and reducing runout in rotating shaft vibration signal detection comprising,
generating a slow roll electrical runout analog signal for a given rotating shaft through an eddy current transducer means,
generating a tachometer signal in synchronization with the rotation of the rotating shaft,
providing a series of synchronized output counts in synchronization with the tachometer signal,
converting said slow roll electrical runout analog signal to a digital runout signal,
accessing a memory means by said synchronized output counts and storing said digital runout signal in said memory means,
reading out the digital runout signal from said memory means to determine its magnitude and acceptability,
transferring said digital runout signal from said memory means to a programmable memory and burning said information in storage into said programmable memory,
connecting said programmable memory in a circuit to said transducer means,
reading said information out of said programmable memory in synchronization with the tachomefer signal,
generating a composite analog signal including the electrical runout and vibration signals for operational shaft RPM,
changing said digital runout signal from the programmable memory to an analog runout signal,
and subtracting said analog runout signal from said composite analog signal providing a output signal with reduced electrical runout.

21. In an apparatus for programming and reducing electrical runout in rotating shaft vibration signal detection comprising,
means for detecting the slow roll electrical runout signal of a rotating shaft and providing a slow roll runout signal,
means for providing a tachometer signal in synchronism with the rotation of the rotating shaft,
a digital memory,
means for accessing the digital memory in synchronism with the tachometer signal,
means for impressing the slow roll runout signal in digital data form in the digital memory,
a programmable read only memory module,
and means for transfering the digital runout data from the digital memory to the programmable read out memory module in synchronization with said tachometer signal.

* * * * *